United States Patent [19]

Dutkiewicz et al.

[11] Patent Number: 5,000,609

[45] Date of Patent: Mar. 19, 1991

[54] RETAINER FOR UNIVERSAL JOINT BEARING CUPS

[75] Inventors: Jeffrey A. Dutkiewicz, Toledo, Ohio; Daniel C. Perry, Temperance, Mich.

[73] Assignee: Dana Corporation, Toledo, Ohio

[21] Appl. No.: 363,440

[22] Filed: Jun. 7, 1989

Related U.S. Application Data

[63] Continuation of Ser. No. 137,499, Dec. 23, 1987, abandoned.

[51] Int. Cl.$^5$ .............................................. F16D 3/26
[52] U.S. Cl. .................................. 403/155; 403/57; 464/130
[58] Field of Search ............... 403/155, 154, 150, 289, 403/376, 405.1, 406.1, 12, 57, 74, 338, 397, 272; 24/563, 545; 464/132, 128, 130, 135, 134

[56] References Cited

U.S. PATENT DOCUMENTS

| | | |
|---|---|---|
| 2,124,803 | 7/1938 | Wollner . |
| 2,132,816 | 10/1938 | Wollner . |
| 2,171,313 | 8/1939 | Pearce . |
| 2,228,715 | 1/1941 | Wollner . |
| 2,271,523 | 2/1942 | Dunn et al. . |
| 2,645,258 | 7/1953 | Blakeley ........................ 464/130 X |
| 2,698,527 | 1/1955 | Anderson ........................ 464/130 |
| 2,770,114 | 11/1956 | Slaght ........................ 464/130 |
| 2,773,368 | 12/1956 | Slaght ........................ 403/57 X |
| 2,860,016 | 11/1958 | Swart, Sr. ........................ 403/155 X |
| 3,254,385 | 6/1966 | Van Horn, Sr. . |
| 3,783,638 | 1/1974 | Doran et al. ........................ 464/130 |
| 4,503,953 | 3/1985 | Majewski ........................ 403/155 X |
| 4,578,849 | 4/1986 | Kaufman ........................ 403/155 X |

FOREIGN PATENT DOCUMENTS 2060136 4/1981 United Kingdom .
2189868 11/1987 United Kingdom .

OTHER PUBLICATIONS

Dana Engineering Drawing Part No. 146, dated 5/19/64.
Dana Engineering Drawing Part No. 146A, dated 5/19/64.

*Primary Examiner*—Peter M. Cuomo
*Attorney, Agent, or Firm*—MacMillan, Sobanski & Todd

[57] ABSTRACT

An improved device for quickly and reliably retaining a pair of bearing cups on a universal joint cross during purging and shipment thereof is disclosed. The retainer includes a central portion which is generally elongated and flat in shape. In a first embodiment, first angled portions are formed integrally with each end of the central portion extending outwardly therefrom. The first angled portions may be oriented at relatively small angles with respect to the central portion. Second angled portions are formed integrally with each end of the first angled portions extending outwardly therefrom. The second angled portions may be oriented at relatively large angles with respect to the first angle portions. The corners between the first and second angled portions are adapted to receive the outer edges of the bearing cups therein. Respective apertures are formed through the retainer at each of such corners to receive locating tangs formed on a mating yoke for the cross. The retainer is frictionally retained on the opposed bearing cups by the inherent resiliency of the retainer, or may alternatively be secured thereto by welding or adhesive. In a second embodiment, the retainer includes a central portion having right angle end portions formed integrally therewith. The retainer of the second embodiment is secured to the respective bearing cups by welding or adhesive.

20 Claims, 2 Drawing Sheets

RETAINER FOR UNIVERSAL JOINT BEARING CUPS

This application is a continuation of Ser. No. 07/137,499, filed 12/23/87, abandoned.

BACKGROUND OF THE INVENTION

The present invention relates in general to devices which are adapted to retain bearing cups onto the ends of universal joint trunnions. In particular, the present invention relates to an improved device for quickly and reliably retaining such bearing cups on a universal joint cross during purging and shipment thereof.

Universal joints are well known devices which provide a driving connection between two members adapted to rotate about respective non-aligned axes of rotation. Universal joints of this type are widely used between rotatable drive shafts in vehicles. Typically, such universal joints include a cross formed by a central body portion having four trunnions extending outwardly therefrom. The trunnions are disposed in a single plane at right angles relative to one another. A bearing cup is rotatably mounted over the end of each of the trunnions. Each of the two opposed pairs of bearing cups is secured to a yoke. The yokes are respectively secured to the rotatable members to provide the universal joint connection therebetween.

When installing universal joints of this type, the following assembly process is frequently followed. A first yoke is initially secured to its associated first rotatable member at a first assembly location, while the bearing cups are mounted on the universal joint cross. One of the two opposed pairs of bearing cups on the cross is then secured to the first yoke. At this point, therefore, only the secured one of the two pairs of the bearing cups is positively retained in position relative to the cross. The other opposed pair of bearing cups remains mounted on the cross, but is not positively retained thereon. Next, the cross is purged with lubricant. Such purging is well known in the art and involves the injection of lubricant within the cross at a relatively high pressure. Subsequent to such purging, the first rotatable member (having the purged cross secured to the first yoke) is shipped to a second assembly location, where the other opposed pair of the bearing cups is secured to a second yoke and its associated second rotatable member.

Several drawbacks have been identified with the above described assembly process. First, as mentioned above, one of the opposed pairs of bearing cups (the pair which is not secured to the first yoke) is not positively retained in position on the cross when the cross is purged with lubricant. As a result, these non-retained bearing cups tend to move apart from one another on the cross during the purging process because of the relatively high pressure created therein. Often, the bearing cups move apart to relative positions which prevent them from being easily assembled into the second yoke. It is known to clamp these bearing cups together during the purging process to reduce this problem. Unfortunately, residual pressure within the cross after completion of the purging process has been known to cause such movement after the clamps are removed.

A second problem identified with the above described assembly process is that the non-retained bearing cups occasionally fall off the cross and become lost during shipment. This generally occurs as a result of an impact to the cross, which is usually exposed during shipment. Also, the high lubricant pressure within the cross may cause the bearing cups to move apart from one another so far that they fall off of the trunnions. Straps are known for retaining the bearing cups on the cross, but it is time-consuming to install such straps for shipment and remove them for subsequent assembly of the universal joint. Thus, it would be desirable to provide a device for quickly and easily retaining the non-retained bearing cups in position on the cross during purging and shipment thereof, and which may be left on the cross during subsequent assembly.

SUMMARY OF THE INVENTION

The present invention relates to an improved device for quickly and reliably retaining a pair of bearing cups on a universal joint cross during purging and shipment thereof. The retainer includes a central portion which is generally elongated and flat in shape. In a first embodiment, first angled portions may be formed integrally with each end of the central portion extending outwardly therefrom. The first angled portions may be oriented at relatively small angles with respect to the central portion. Second angled portions may be formed integrally with each end of the first angled portions extending outwardly therefrom. The second angled portions may be oriented at relatively large angles with respect to the first angle portions. The corners between the first and second angled portions are adapted to receive the outer edges of the bearing cups therein. Respective apertures may be formed through the retainer at each of such corners to receive locating tangs formed on a mating yoke for the cross. The retainer may be frictionally retained on the opposed bearing cups by the inherent resiliency of the retainer, or may alternatively be secured thereto by welding or adhesive. In a second embodiment, the retainer includes a central portion having right angle end portions formed integrally therewith. The retainer of the second embodiment is secured to the respective bearing cups by welding or adhesive.

It is an object of the present invention to provide an improved device for quickly and reliably retaining a pair of bearing cups on a universal joint cross during purging and shipment thereof.

It is another object of the present invention to provide such an improved retainer which may be permanently attached to the bearing cups to prevent rotation relative to a yoke secured to such bearing cups.

It is a further object of the present invention to provide such an improved bearing cup retainer which is simple and inexpensive in construction and installation.

Other objects and advantages of the present invention will become apparent to those skilled in the art from the following detailed description of the preferred embodiments, when read in light of the accompanying drawings.

DETAILED DESCRIPTION OF THE PREFERRED EMBODIMENTS

Figure 1:
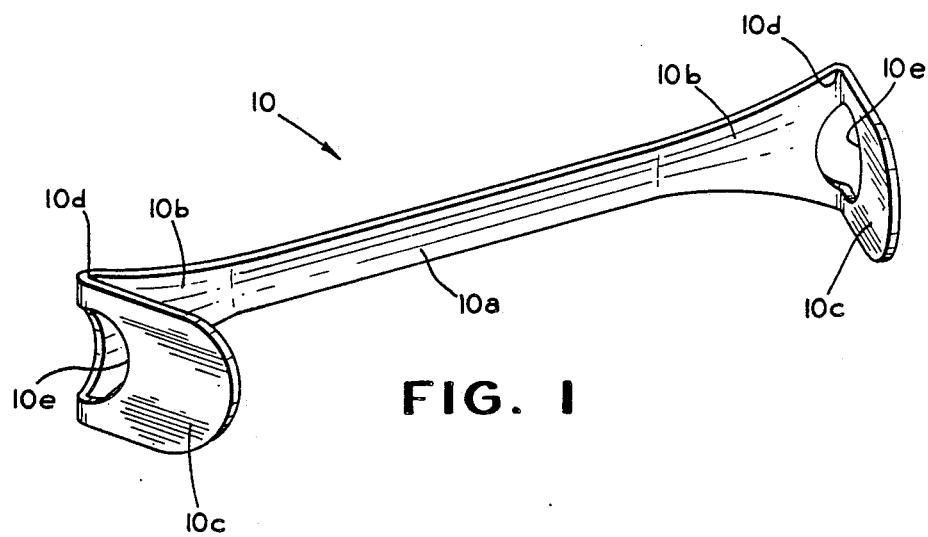
FIG. 1 is a perspective view of a bearing cup retainer in accordance with the present invention.

Referring now to the drawings, there is illustrated in FIG. 1 an improved bearing cup retainer, indicated generally at 10, in accordance with the present invention. The retainer 10 is formed from a single piece of material which may, for example, be stainless steel or a similar stiff but flexible metal. The retainer 10 includes a central portion 10a which is generally elongated in shape. The central portion 10a is relatively narrow in width and may be flat or slightly curved in cross section.

A first angled portion 10b is formed integrally with each of the opposed ends of the central portion 10a. The first angled portions 10b are oriented at a relatively small angle with respect to the central portion 10a, such as approximately fifteen degrees measured from the extended axis defined by the central portion 10a. The first angled portions 10b expand in width as they extend outwardly from the central portion 10a and may also be flat or slightly curved in cross section. A second angled portion 10c is formed integrally with each of the opposed ends of the first angled portions 10b. The second angled portions 10c are oriented at a relatively large angle with respect to the central portion 10a, such as approximately one hundred fifteen degrees measured from the extended axis defined by the central portion 10a. The second angled portions 10c have generally constant widths and terminate in respective curved ends.

A corner 10d is defined at each of the junctions between the first angled portions 10b and the second angled portions 10c. An interior angle is defined between each of the adjoining first and second angled portions 10b and 10c, which may be approximately eighty degrees. Thus, it can be seen that the second angled portions 10c are oriented such that they define axes extending from the corners 10d which point inwardly toward one another, as opposed to being parallel or pointing away from each other. An aperture 10e is formed through the retainer 10 at each of the corners 10d thereof. The apertures 10e extend partially through both the first angled portions 10b and the second angled portions 10c. The purposes of the corners 10d and the apertures 10e will be explained in detail below.

Figure 2:
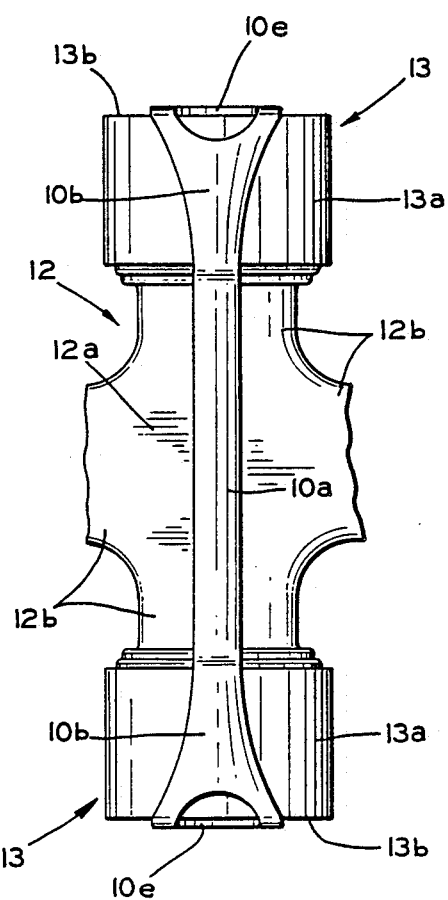
FIG. 2 is a front elevational view, partially broken away, of a universal joint cross showing the bearing cup retainer of FIG. 1 installed thereon.
Figure 3:
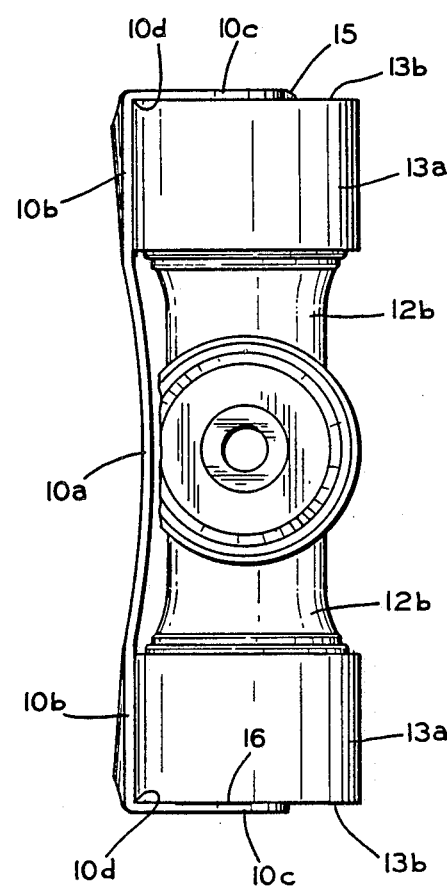
FIG. 3 is a side elevational view, partially broken away, of the universal joint cross of FIG. 2.

Referring now to FIGS. 2 and 3, there is illustrated a cross, indicated generally at 12, for a universal joint assembly. The cross 12 is conventional in the art and includes a central body portion 12a having four trunnions 12b extending outwardly therefrom. The trunnions 12b are disposed at right angles to one another and lie in a single plane. A bearing cup, indicated generally at 13, is rotatably mounted over the end of each of the trunnions 12b. Each bearing cup 13 includes a circumferential side surface 13a and a flat end surface 13b. An outer circular edge is defined about each of the bearing cups 13 along the junction between the circumferential sides surface 13a and the end surface 13b. When the bearing cups 13 are assembled onto the cross 12 as shown, the end surfaces 13b of the opposed bearing cups 13 face outwardly from one another in opposite directions.

The sizes of the various portions of the retainer 10 may be varied to accommodate different sizes of crosses 12 and bearing cups 13. Generally, the length of the central portion 10a of the retainer 10 is approximately equal to the distance separating the innermost ends of the bearing cups 13 when they are assembled onto the cross 12 as described above. The lengths of the first angled portions 10b are approximately equal to the longitudinal lengths of the circumferential side surfaces 13a of the bearing cups 13, while the lengths of the second angled portions 10c are approximately equal to the radii of the end surfaces 13b.

The retainer 10 may be assembled onto the cross 12 so as to extend over the opposed bearing cups 13 as shown in FIGS. 2 and 3. In order to accomplish this, the second angled portions 10c are manually spread apart so that they can be pushed over the opposed end surfaces 13b. When so assembled, the central portion 10a of the retainer 10 extends over the central body portion 12a of the cross 12, the first angled portions 10b extend over the circumferential side surfaces 13a of the bearing cups 13, and the second angled portions 10c extend over the end surfaces 13b. As best shown in FIG. 3, the corners 10d of the retainer 10 abut the edges defined between the circumferential side surfaces 13a and the end surfaces 13b of the bearing cups 13 when the retainer 10 is installed on the cross 12.

As best shown in FIG. 3, the retainer 10 is deformed somewhat from its relaxed shape shown in FIG. 1 when it is installed on the cross 12. Specifically, the central portion 10a is bowed inwardly toward the central body portion 12a of the cross 12 when the retainer 10 is installed. Additionally, the first angled portions 10b are flexed such that they are oriented parallel to one another, while the second angled portions 10c are flexed such that they extend perpendicularly from the first angled portions 10b. This flexing causes the second angled portions 10c to frictionally engage the end surfaces 13b of the bearing cups 13 such that the retainer 10 resists removal from the cross 12. By varying the size and shape of the retainer 10, as well as the specific material used to form the retainer 10, the amount of force required to remove the retainer 10 from the cross 12 may be varied as desired.

As mentioned above, the corners 10d of the retainer 10 receive the corners of the bearing cups 13 therein. As a result, any forces attempting to move the opposed bearing cups 13 apart from one another are focused in the corners 10d of the retainer 10. Consequently, these forces are directed such that they attempt to elongate the central portion 10a of the retainer 10, as opposed to merely flexing the second angled portions 10c apart from one another. Therefore, the retainer 10 is capable of resisting relatively large magnitudes of such forces.

Preferably, the retainer 10 is installed on the cross 12 prior to the start of the purging process described above. When this is done, the retainer 10 prevents the bearing cups 13 from being moved apart from one another during the purging process. The retainer 10 may remain installed on the cross 12 during shipment thereof. The frictional engagement between the retainer 10 and the bearing cups 13 prevents the accidental removal of the retainer 10 caused by most impacts sustained during shipment. Thus, the retainer 10 of the present invention provides an effective solution to these problems in a manner which is both simple and inexpensive.

When the retainer 10 is installed as described above, it may be removed after shipment for installation. Such removal is easily accomplished by applying an appropriate removal force. If desired, however, the retainer 10 may be permanently secured to the bearing cups 13 before shipment. Such permanent securement may be accomplished by any known means, such as by welding (as shown at 15 on the upper bearing cup 13 in FIG. 3) or adhesive (as shown at 16 on the lower bearing cup 13 in FIG. 3). Typically, the welding 15 will be made between the second angled portion 10c of the retainer 10 and the corresponding end surface 13b of the bearing cup 13. The adhesive 16, alternatively, may be applied between the first angled portion 10b of the retainer 10 and the corresponding circumferential side surface 13a of the bearing cup 13. The adhesive 16 may consist of an acrylic structural adhesive having an accelerator to reduce the drying time thereof. The advantages gained by permanently attaching the retainer 10 to the bearing cups 13 are explained in detail below.

Figure 4:
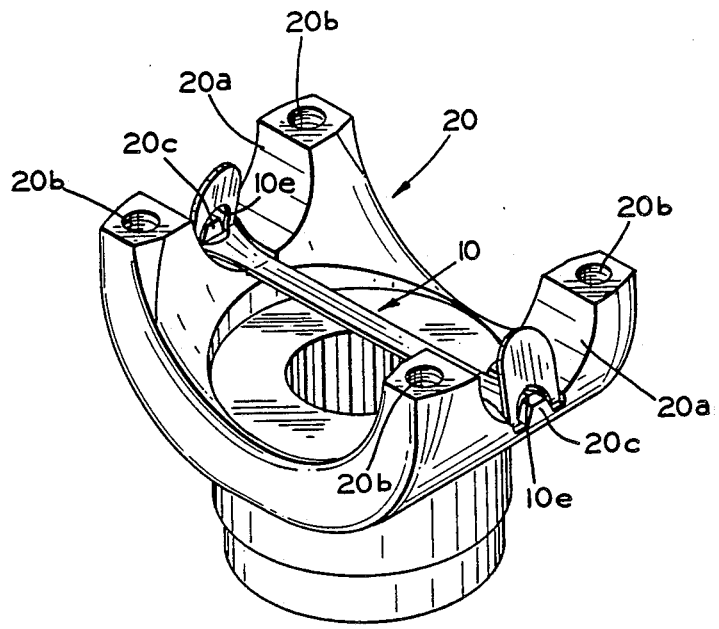
FIG. 4 is a perspective view of a portion of a conventional yoke shown in cooperation with the bearing cup retainer of FIG. 1.

Referring now to FIG. 4, there is illustrated a portion of a conventional half round yoke, indicated generally at 20. The yoke 20 is adapted to be secured to a rotatable member (not shown) and includes two arm portions 20a. The arm portions 20a are adapted to receive the opposed bearing cups 13 therein in a known manner. Conventional straps (not shown) are secured to the arm portions 20a of the yoke 20 by threaded fasteners (not shown) extending into threaded apertures 20b so as to retain the bearing cups 13 therein. An upstanding locating tang 20c is formed on each of the arm portions 20a to assist in properly locating the bearing cups 13 and the cross 12 during assembly into the yoke 20. The locating tangs 20c also prevent movement of the cross 12 along an axis defined by such tangs 20c after installation.

The apertures 10e formed through the corners 10d of the retainer 10 are sized to extend completely around the respective locating tangs 20c. This permits the apertures 10e to receive the locating tangs 20c therein, as shown in FIG. 4, when the retainer 10 is assembled (with the cross 12 and the bearing cups 13) into the yoke 20. The cross 12 and the bearing cups 13 have been omitted in FIG. 4 for the purpose of clarity. However, it is apparent from such illustration that the cross 12 and the bearing cups 13 may be assembled into the yoke 20 in a conventional manner without any interference between the retainer 10 and the locating tangs 20c.

Thus, not only may the retainer 10 be clipped over the opposed bearing cups 13 for purging and shipment, but the retainer 10 may be left in position on the cross 12 for installation into the yoke 20. If the retainer 10 is permanently secured to the bearing cups 13, then the retainer 10 additionally functions to limit the amount by which the bearing cups 13 may rotate relative to the yoke 20 following installation therein. The sizes of the apertures 10e in the retainer 10 relative to the sizes of the locating tangs 20c will determine how much relative rotation will be permitted. As is apparent from FIG. 4, the sides of the apertures 10e will abut the locating tangs 20c when the retainer 10 (which is secured to the bearing cups 13) is rotated a predetermined distance. Thus, further rotation of the retainer 10 and the bearing cups 13 is prevented. Such relative rotation is generally not desirable, since the bearing cups 13 are internally lubricated to permit the trunnions 12b of the cross 12 to rotate therein.

Figure 5:
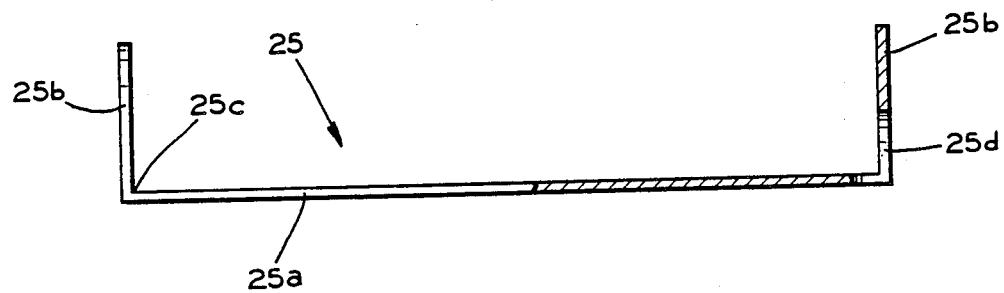
FIG. 5 is a side elevational view, partially in cross section, of an alternate embodiment of a bearing cup retainer in accordance with the present invention.

Referring now to FIG. 5, an alternate embodiment of the retainer of the present invention is indicated generally at 25. The retainer 25 includes a flat central portion 25a having a pair of end portions 25b extending perpendicularly from the opposed ends thereof. A corner 25c is defined at the junction between the central portion 25a and each of the end portions 25b. An aperture 25d is formed through each of the corners 25c, similar to the apertures 10e described above. The length of the central portion 25a of the retainer 25 is approximately equal to the longitudinal distance between end surfaces 13b of the bearing cups. The retainer 25 functions similarly to the retainer 10 described and illustrated above, except that the retainer 25 will not typically frictionally engage the bearing cups 13 with sufficient force to prevent the accidental removal thereof. Thus, the retainer 25 will normally be utilized only in combination with some means for attaching it to the bearing cups 13, such as the welding 15 or adhesive 16 described above.

In accordance with the provisions of the patent statutes, the principle and mode of operation of the present invention have been explained and illustrated in its preferred embodiment. However, it must be understood that the present invention may be practiced otherwise than as specifically explained and illustrated without departing from its spirit or scope.

What is claimed is:

1. A device for retaining a pair of opposed bearing cups on a respective pair of opposed trunnions on a universal joint cross, each of the bearing cups including a circumferential side surface, an end surface, and an edge defined along the junction between the circumferential side surface and the end surface, the device comprising:
   a central portion having opposed ends; and
   an angled portion extending from each of said central portion opposed ends, each of said angled portions being normally oriented so as to define an interior angle which is less than perpendicular relative to said central portion but being flexible so as to extend generally parallel to one another along the end surfaces of the bearing cups when installed on the universal joint cross, respective corners being defined between said central portion and each of said angled portions, said corners adapted to extend over and abut the edges of the associated bearing cups so that forces tending to move the bearing cups apart from one another are primarily transmitted to said central portion.

2. The invention defined in claim 1 further including an aperture formed through each of said corners adapted to expose a portion of the end surface of the associated bearing cup.

3. The invention defined in claim 1 wherein said interior angles are approximately sixty-five degrees.

4. The invention defined in claim 1 further including means for attaching said device to at least one of the bearing cups.

5. The invention defined in claim 4 wherein said means for attaching includes welding.

6. The invention defined in claim 4 wherein said means for attaching includes adhesive.

7. A device for retaining a pair of opposed bearing cups on a respective pair of opposed trunnions of a universal joint cross, the bearing cups each including a circumferential side surface, an end surface, and an edge defined along the junction between the circumferential side surface and the end surface, the device comprising:

a central portion having opposed ends;

a first angled portion extending from each of said opposed ends of said central portion;

a second angled portion extending from each of said first angled portions, each of said second angled portions being normally oriented so as to define an interior angle which is less than perpendicular relative to said central portion but being flexible so as to extend generally parallel to one another along the end surfaces of the bearing cups when installed on the universal joint cross, respective corners being defined between said each of said first and second angled portions, said corners adapted to extend over and abut the edges of the associated bearing cups so that forces tending to move the bearing cups apart from one another are primarily transmitted to said central portion.

8. The invention defined in claim 7 further including an aperture formed through each of said corners adapted to expose a portion of the end surface of the associated bearing cup.

9. The invention defined in claim 7 wherein said first angled portions are each normally oriented so as to define an exterior angle which is relatively small relative to said central portion.

10. The invention defined in claim 9 wherein said exterior angles are approximately fifteen degrees.

11. The invention defined in claim 7 wherein said interior angles are approximately sixty-five degrees.

12. The invention defined in claim 7 further including means for attaching said device to at least one of the bearing cups.

13. The invention defined in claim 12 wherein said means for attaching includes welding.

14. The invention defined in claim 12 wherein said means for attaching includes adhesive.

15. A universal joint cross comprising:

a pair of opposed trunnions;

a bearing cup mounted on each of said opposed trunnions, each of said bearing cups including a circumferential side surface, an end surface, and an edge defined along the junction between said circumferential side surface and said end surface; and a device for retaining said bearing cups on said trunnions, said device including a central portion having opposed ends and an angled portion extending from each of said central portion opposed ends, each of said angled portions being normally oriented so as to define an interior angle which is less than perpendicular relative to said central portion but being flexible so as to extend generally parallel to one another along the end surfaces of said bearing cups, respective corners being defined between said central portion and each of said angled portions, said corners extending over and abutting said edges of said bearing cups so that forces tending to move said bearing cups apart from one another are primarily transmitted to said central portion.

16. The invention defined in claim 15 further including an aperture formed through each of said corners adapted to expose a portion of the end surface of the associated bearing cup.

17. The invention defined in claim 15 wherein said interior angles are approximately sixty-five degrees.

18. The invention defined in claim 15 further including means for attaching said device to at least one of the bearing cups.

19. The invention defined in claim 18 wherein said means for attaching includes welding.

20. The invention defined in claim 18 wherein said means for attaching includes adhesive.

* * * * *